United States Patent
Bouldin et al.

(10) Patent No.: US 6,434,914 B1
(45) Date of Patent: Aug. 20, 2002

(54) TAG PLACEMENT APPARATUS

(75) Inventors: E. Lloyd Bouldin; Graham Goodenough, both of McMinnville, TN (US)

(73) Assignee: Bouldin & Lawson, Inc., McMinnville, TN (US)

( * ) Notice: Subject to any disclaimer, the term of this patent is extended or adjusted under 35 U.S.C. 154(b) by 0 days.

(21) Appl. No.: 09/431,143

(22) Filed: Nov. 1, 1999

(51) Int. Cl.[7] .............................................. B65B 35/30
(52) U.S. Cl. ............................ 53/534; 53/154; 53/238; 53/240; 53/247; 414/797.8; 221/211
(58) Field of Search ...................... 53/534, 539, 435, 53/474, 445, 247, 238, 240, 246, 155, 154, 69; 414/797.8, 798.9; 271/108, 102, 104, 90, 99; 198/341.01

(56) References Cited

U.S. PATENT DOCUMENTS

| | | | |
|---|---|---|---|
| 2,942,392 A | | 6/1960 | McCain |
| 3,780,627 A | | 12/1973 | Roda |
| 4,574,556 A | * | 3/1986 | Schmidt et al. ................. 53/69 |
| 4,947,579 A | * | 8/1990 | Harrison et al. .............. 47/1.01 |
| 4,996,820 A | * | 3/1991 | Harrison, Jr. ................... 53/69 |
| 5,289,666 A | * | 3/1994 | Hamilton ...................... 53/252 |
| 5,845,462 A | * | 12/1998 | Kuehl et al. ................... 53/435 |
| 5,953,887 A | * | 9/1999 | Lucas et al. ................... 53/534 |

* cited by examiner

Primary Examiner—Rinaldi I. Rada
Assistant Examiner—Thanh Truong
(74) Attorney, Agent, or Firm—Rick R. Wascher

(57) ABSTRACT

A tag placement apparatus useful for placing a tag or label into communication with a container. The tag placement apparatus includes at least one tagging head having a linear slot in which a cam portion of a tag placement arm assembly reciprocally travels in response to a cylinder stroke to which it is attached. The tagging apparatus further includes an encoder for translating the roller rotation of a conveyor assembly into belt position and travel which in turn regulates the speed in which the reciprocal movement of the tag placement arm operates during use.

14 Claims, 6 Drawing Sheets

SECTION A-A

TAG PLACEMENT APPARATUS

BACKGROUND OF THE INVENTION

1. Field of the Invention

The present invention relates generally to machines for placing tags into soil-filled plant containers used in the nursery and greenhouse industries and related markets.

2. Description of the Art to which the Invention Relates

The art to which the invention relates incorporates tagging machines and other tagging devices capable of placing identification labels or tags (hereinafter "tags") into communication with a flat, pot, cup or tray (hereinafter referred to as "container(s)") which typically contain soil or other growing media, seedlings or small plants. The tags placed by the inventive apparatus claimed herein as well as those comprising some of the art to which the invention relates are formed of a thin sheet of plastic or polymeric material, have a spiked end and a placard end extending upward and opposite the spiked end.

The apparatuses comprising the art to which the invention relates typically take possession of a tag from a supply of tags residing within a tag reservoir and insert the spiked end of the tag into the soil or other growing media within the cell portion of the container. It is known that manual placement of tags is a tedious and somewhat time-consuming job. Furthermore, considering the seasonal number of trays and variety of containers used by the various growers in the nursery and greenhouse industry the hand placement of tags could entail the positioning of millions of tags. Hand placement of tags is, therefore, in many cases inefficient and expensive particularly with respect to the large growing operations.

U.S. Pat. No. 2,942,392 granted to McCain on Jun. 28, 1960 is directed to an apparatus for transferring articles in abutting relation to each other from one magazine into another magazine in spaced relationship. The McCain device uses a ratcheting mechanism for movement of the placement apparatus.

U.S. Pat. No. 3,780,627 granted to Roda on Dec. 25, 1973 is directed to a machine for the automatic formation and insertion of container partitions. The Roda apparatus does not use a vacuum placement arm for positioning the container partitions being placed.

U.S. Pat. No. 4,574,556 granted to Schmidt, et. al. on Mar. 11, 1986 is directed to a label-inserting apparatus. The Schmidt et. al. apparatus is a device for automatically inserting identification labels in plant containers. The Schmidt device comprises a conveying track for conveying the containers along a predetermined path, a horizontal label storage magazine positioned above the path for holding the labels in the stack, and an insertion mechanism mounted transversely to the outer end of the storage magazine.

U.S. Pat. No. 4,996,820 and its parent U.S. Pat. No. 4,947,579 are granted to Harrison, et. al. and Harrison, Jr. respectively. The '579 and '820 patents are directed to tagging machines for seedling transplants. The tagging portion of the Harrison patents can be described as an automatic tagging machine where the tags are stacked and retained in individual vertically extending magazines in a transversely spaced apart array.

The conveyor indexes a tray having a plurality of plant receiving cells along the path of travel. A tagger arm fitted with a suction mechanism takes possession of a tag rotates the tag into an insertion position, and places the spiked portion of the tag into the growing media. The rotation of the tag placement arm is constrained by a central rod which pivots through more than 90 degrees of reciprocal rotary displacement.

U.S. Pat. No. 5,289,666 granted to Hamilton on Mar. 1, 1994 is directed to an apparatus for applying label tags. The Hamilton apparatus can be generally described as a tagging machine capable of automatically inserting label-type tags into selected compartments of a seedling tray as the tray passes under the tagging machine. A cartridge loaded with tags feeds the tags one by one to a breech channel.

A pair of extractor fingers lift the tags in the breech channel onto a deflector which deflects the emerging end of the tag between a pair of displacement fingers. Once displacement fingers have received the tag, they drive the tag back along the channel in the opposite direction to discharge the tag into the seedling tray by inserting the spiked end of the tag into the soil.

U.S. Pat. No. 5,953,887 granted to Lucas et al., is directed to a tagging apparatus which includes a cylinder driven picker arm which reciprocates between a first and second position along a J-shaped channel of a cam plate. The J-shape of the cam plate provides is believed to be the point of novelty as compared to the other prior art patented devices because it controls the movement of the picker arm and thus the positioning of the tag during use.

A common problem not addressed by any of the aforementioned devices as well as other devices comprising the art to which the invention relates is the inability of the tagging apparatus to effectively prevent whipping or bending of the tag during the time when the tag is removed from its reservoir until it is briskly moved and placed into communication with the tray or container. This whipping is quite common as the tag stock itself has diminished in density and thickness over the years, thereby making the tags less stiff and more susceptible to bending and whipping. Furthermore, the brisk movement of the tag through a greater than 90 degree arc travel has been found to cause significant bending and whipping because of the rather abrupt start and stop as well as the associated momentum of the tag during the placement stroke.

The present invention is believed to overcome this problem which translates into better tag placement and consistent insertion into the trays into which the tags are to be placed by minimizing the directional rotation of the tag during its placement operation.

Another drawback associated with the art to which the invention relates is the inability of the aforementioned machines, as well as others comprising the art to which the invention relates, to consistently tag on the fly. "On the fly" tagging often refers to the process of extracting a tag from its reservoir and inserting it into a tray while the conveyor which supports the soil-filled and plant-filled trays continuously moves along its predetermined path. Of course this relates to an element of speed associated with the tagging apparatus and the quickness with which the tag is withdrawn from its reservoir and rotated much more than 90 degrees prior to its placement into the tray or container to complete the tagging operation.

Furthermore, the phenomenon associated with tag bending and whipping is also known to be caused by the vacuum pressure generated by the suction cup portion of the devices comprising the art to which the invention relates. Oftentimes the suction pressure of such devices must be relatively high in order to take possession of the tag and allow it to be forcibly inserted into the tray soil. Thus, it would be desirable to minimize the travel of the tag and lessen the vacuum pressure exerted on the tag immediately prior to its placement into the soil container.

Still further, the known tagging machines comprising the art to which the invention relates cannot be considered modular to enable the tag placement portion of those devices to be positioned in the path of the container, off to one side, or any user-selectable and variable position by virtue of the supporting frame structure and removable tagging head portion. For example, the tagging machines comprising the art to which the invention relates do not allow for tagging from the side of the plant container due to the difficulty of setup and consistent tag placement. The art to which the invention relates also does not synchronize belt travel with the cycling of the tagging head and thus may become out of time with the container in which the tag is to be placed thereby causing errant or non-existent tag placement, and making tagging on the fly virtually impossible.

Virtually all of the known disadvantages associated with the art to which the invention relates is attributable to the non-linear stroke of the cylinder as well as the unsynchronized cycling of the tag placement arm with respect to the conveyor on which the container rests during use.

It would be preferred, and is hereby invented, a tagging apparatus with a linear travel of the tagging arm, minimally rotatable tag movement from preferably a zero to less than 90 degree arc, and belt movement and cycling rate of the tagging head itself.

Accordingly, until now, a modular tagging machine capable of taking possession of a plastic tag having a flag end opposite a spiked end, minimize bending and whipping of the tag by moving it through less than a 90 degree arc, and timing its placement to correspond with the speed at which the container moves beneath the tagging head has not been invented.

SUMMARY OF THE INVENTION

The present invention is a tagging machine comprising a frame portion preferably outfitted with a plurality of wheels to make it mobile. The frame supports a horizontal and longitudinal conveyor belt which is motor-driven. The preferred embodiments include an encoder apparatus to calculate the rotations of the roller mechanism which drives the conveyor belt and translate the rotations to the speed of the conveyor belt and thus the speed of the trays or containers resting thereon prior to receiving a tag.

Hence, while the encoder of the present invention is preferably configured to correlate the rotations of the roller with belt travel and thus tray travel along the belt, this feature and advantage is particularly important when one considers the various sized trays in which to place tags. The user of the present invention may simply adjust the tray speed by the control box which automatically correlates the rotation of the roller to account for the amount of belt travel and thus container travel.

Therefore, the present invention is also unique with respect to its ability to account for belt and container travel so that the cycling rate of the tagging head will correspond with the correct placement of the tag with respect to the cells or compartments of the container.

The frame further comprises a lower portion and an upper portion. The lower portion is configured to support the aforementioned conveyor and its belt with a conveyor bed interpositioned between the upper and lower races of the continuous belt. The upper race of the belt lies flat against the bed. The upper portion of the frame is configured to support a frame standard which is outfitted with the control box and various pneumatic components required to drive the pneumatic cylinder(s) which effectively operate the tagging heads (described hereinbelow).

The tagging head component(s) preferably comprise a support plate onto which a tag cartridge or reservoir is removably mounted as is a tag placement arm which reciprocally travels to a tag taking position at the bottom of the reservoir to a tag placement position over the belt. The tag cartridge forms an angle with respect to the horizontal to enable the tags to rest in a nearly lying down position, and enable the tag placement arm to sweep through an angle less than 90 degrees to grasp the lowermost tag on the bottom of the reservoir by an applied contact between the tag and at least one suction cup.

In addition, the support plate includes a substantially vertical but linear slot having an upper end and a lower end. In the tag position the cam to which the placement arm is attached occupies the lower end of the slot, and during the tag extraction position it occupies the upper beveled end of the slot. The upper portion of the slot is beveled to enable the cam portion of the tag placement arm assembly to rotate in response to the bevel angle and stroke of the cylinder shaft which drives the reciprocating (cyclical) placement arm.

The control box and pneumatic cylinders are used to automatically adjust the speed of the cyclical movement of the tag placement arm during the tagging process. This reciprocal cyclical movement is predominantly an up and down motion of the cam within the slot as driven by the cylinder shaft. This movement enables the bevel at the upper end of the slot to cause an arcuate tip portion of the cam to rotate and deflect the suction cup portion of the tag placement arm attached to the tang of the cam and deflect it from its linear line and forcibly press it against the placard portion of the tag. A vacuum is established through the suction cup to cause the tag to adhere to the suction cup portion of the tag placement arm.

Once the tag placement arm takes possession of the tag itself, it is moved downward by virtue of the pneumatic cylinder shaft which is preferably parallel to the slot. Thus, the tag placement arm travels linearly parallel to the slot on its way to placing the tag within the tray. Of course, at the initial downward stroke of the cylinder the cam portion of the tag placement arm is pushed away from the bevel enabling it to rotate preferably counterclockwise when viewed with the trays moving from left to right along the conveyor bed. The encoder translates the speed of the belt to the control box and its related components to allow the cylinder to be synchronized with respect to the distance the tray or container has traveled so that a single tag is inserted into each container compartment as desired by the user.

For example, a tray having 8 identical cells equally spaced apart has a given overall length and width different than a container having for example sixteen cells and the same overall dimension. The cyclical rate of the cylinder must be faster for the sixteen cell tray as compared to the eight cell tray if the belt speed were constant between the two.

Thus, depending upon the speed of the belt on which the tray rests, the cells themselves will pass directly beneath the substantially vertical placement arm(s) already having taken possession of tag from the reservoir by virtue of the suction and the forces associated vacuum. Driving the cylinder downward causes the tag placement arm to move downward to insert the spiked portion of the tag into the desired cell. The process is repeated faster and more reliably than ever before until this process is repeated, and each cell of the given tray receives a tag.

In the preferred embodiment, a pair of optional positioning rails keeps the trays centered along the belt or off-centered depending on the position of the tag placement heads. In the alternative, assuming the tray is centered the tag placement heads themselves may be moved along the substantially horizontal support which comprises a part of the upright frame so long as the center or desired tagging location of the tray lies or passes beneath the placement arm during use.

The apparatus of the present invention may be summarized in a variety of ways, one of which is the following: A tag placement apparatus, comprising a frame; a conveyor assembly supported by the frame; a tagging head assembly supported by the frame; the tagging head assembly further comprises a support plate having a linear slot, a tag placement arm assembly partially configured for reciprocal movement in association with the slot, and cylinder means connected to the tag placement arm assembly for cycling the tag placement arm assembly between a first stop position and a second stop position.

The preferred tag placement arm assembly further comprises a cam, a tag placement arm extending from a portion of the cam. The preferred cam is configured to rotate the tag placement arm when a portion of the cam forcibly contacts a beveled end of the linear slot in response to the cycling of the cylinder means. The first stop position is spaced less than ninety degrees from the second stop position and the first stop position corresponds with the tag taking position of the placement arm and the second stop corresponds with the tag placement position of the placement arm.

An optional guide mechanism attached to the plate to help constrain the cam and tag placement assembly during high speed operation. The preferred conveyor assembly further comprises a continuous belt having an upper race and a lower race, and at least one belt roller. A conveyor bed interpositioned between the upper race and lower race. An encoder is also provided as the means for measuring the rotational speed of the belt roller.

The control box or control means is used to synchronize the speed of the continuous belt and the cycling rate of the tag placement arm assembly. Thus the preferred cylinder means further comprises a cylinder having a cylinder shaft situated substantially parallel to the slot to minimize unnecessary movements of the tag placement assembly.

Another way to summarize the present invention is as follows: A tag placement apparatus for placing tags into communication with a container, comprising a frame having space apart ends; conveyor means, supported by the frame, for moving a container resting on a continuous belt portion from one end of the frame to the other; a tagging head assembly attached to the frame wherein the tagging head assembly includes a support plate having a substantially linear slot, a tag placement arm assembly partially configured for reciprocal movement within the confines of the slot, and at least one cylinder having a cylinder shaft attached to the tag placement arm assembly for cycling the tag placement arm assembly between a first tag taking position and a second tag placement position.

The preferred tag placement arm assembly, further comprises a cam configured for engagement with the linear slot, and a tag placement arm extending from a portion of the cam. The preferred cam is configured to rotate the tag placement arm when a portion of the cam forcibly contacts a beveled end of the slot in response to the cycling of the cylinder shaft to enable the tag placement arm to move between the tag taking position and the tag placement position.

A significant advantage of the present invention is the position of the tag taking position is spaced less than ninety degrees from the tag placement position. An optional cam guide mechanism is attached to the plate in some embodiments.

DETAILED DESCRIPTION OF THE PREFERRED EMBODIMENTS

Figure 1:
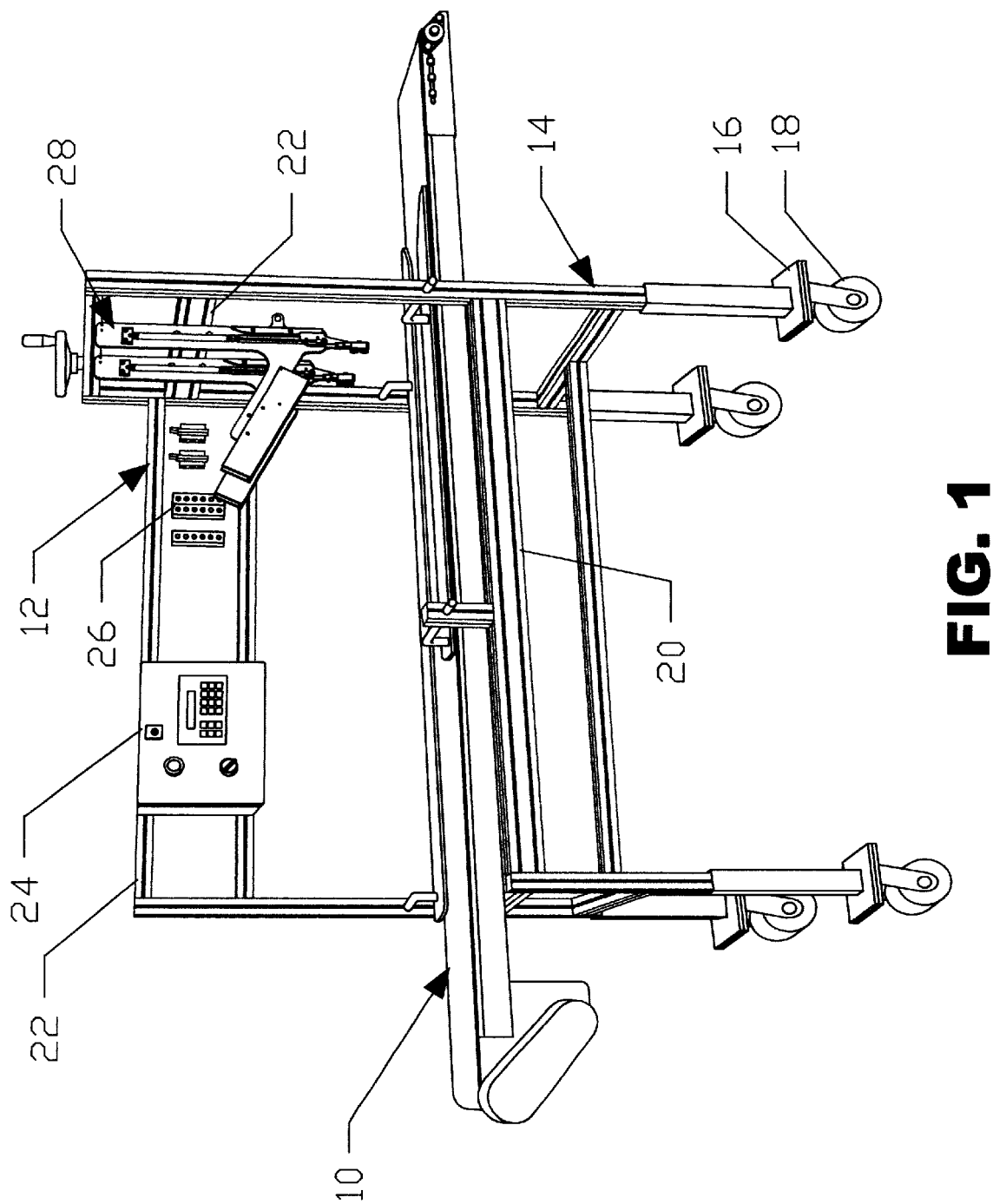
FIG. 1 is an elevated perspective view of the preferred embodiment of the present invention.
Figure 2:
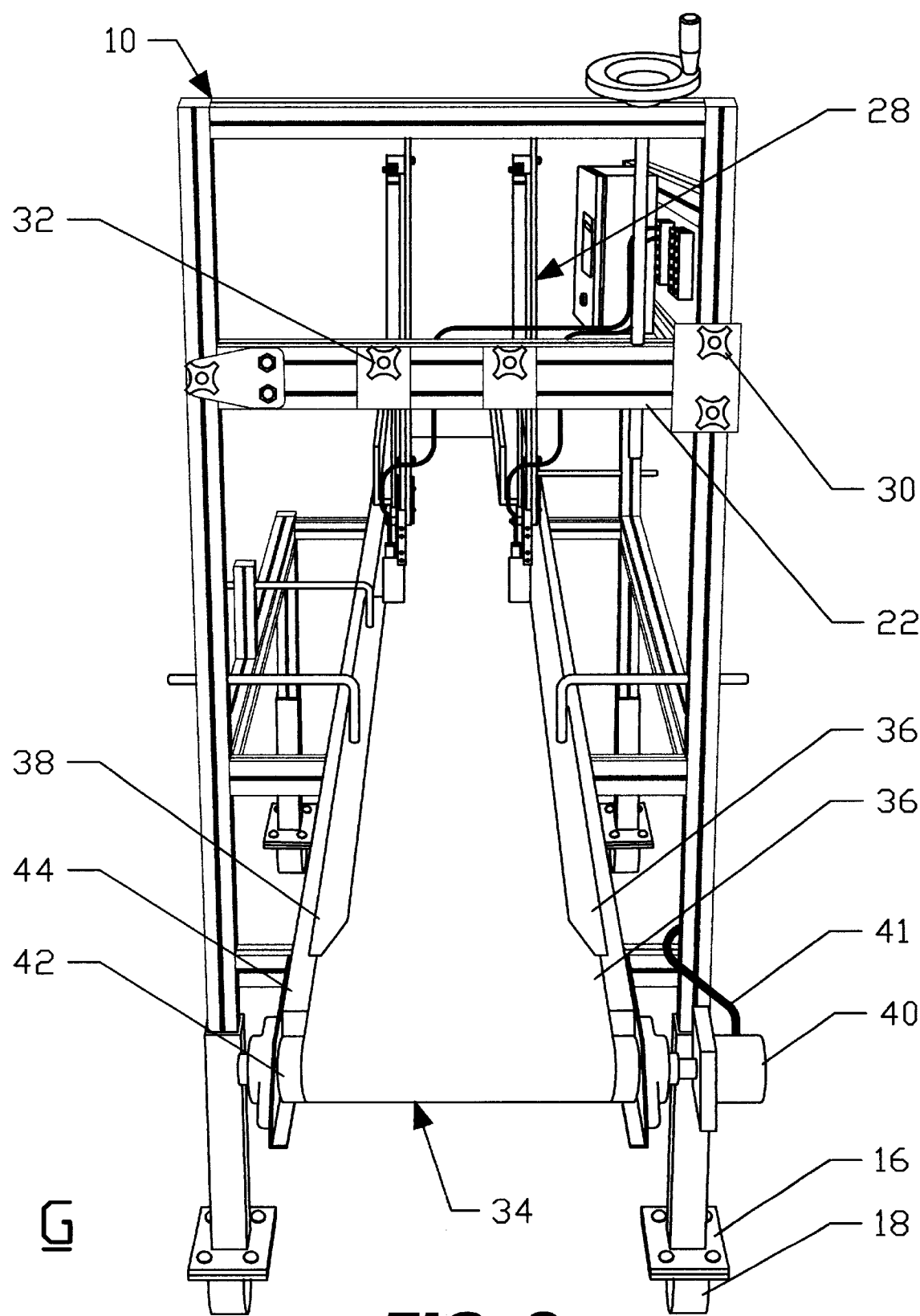
FIG. 2 is an elevated end view of the preferred embodiment shown in FIG. 1.

With reference to FIGS. 1 and 2 the preferred embodiment of the present invention is designated generally by the reference numeral 10. The preferred embodiment includes an upright frame portion and a lower frame portion designated generally by the reference numerals 12 and 14 respectively. Lower frame portion 14 further includes a plurality of wheeled supports 16, having wheels 18 associated therewith. In addition, the lower portion of the frame 14 further includes substantially horizontal frame supports 20 and similarly the upper frame component 12 preferably includes a plurality of horizontal frame components 22. A control box 24 and pneumatic valve regulator assembly 26 as well as at least one tagging head assembly designated generally by the reference numeral 28 are typically attached to the upper frame portion for 12.

With reference to FIG. 2 adjustment knobs 30 and 32 enable the substantially horizontal supports 22 and tagging heads 28 respectively to be moved in virtually any user-selectable position along their associated frame segments to accommodate a variety of different trays, pots, cups, etc. ("containers") used during the tagging process. A conveyor assembly designated generally by the reference numeral 34 is preferably horizontally positioned substantially parallel to the ground G, on which the preferred apparatus rests. The conveyor assembly 34 further comprises a continuous belt 36 and optional tray or container positioning guides 38, spaced apart on each side of the continuous belt as shown in FIG. 2. A bed 44 is interpositioned between the upper and lower races of the continuous belt.

Encoder 40 is in communication with the roller 42 of the conveyor assembly 34 and positioned at one end of the conveyor bed 44 onto and over which the upper race 36 of the conveyor belt travels. Assuming there is no belt slippage, the encoder 40 is provided to translate the number of rotations of the roller 42 into the distance any particular point on the continuous belt 36 travels during operation.

The belt travel information as measured by the encoder 40 is sent by cabling 41 to the control box 24 which in turn regulates the on and off vacuum pressure (described below) by virtue of the vacuum regulator assembly designated generally by the reference numeral 43 of FIG. 3, and the cycling rate of the cylinder 46.

Figure 3:
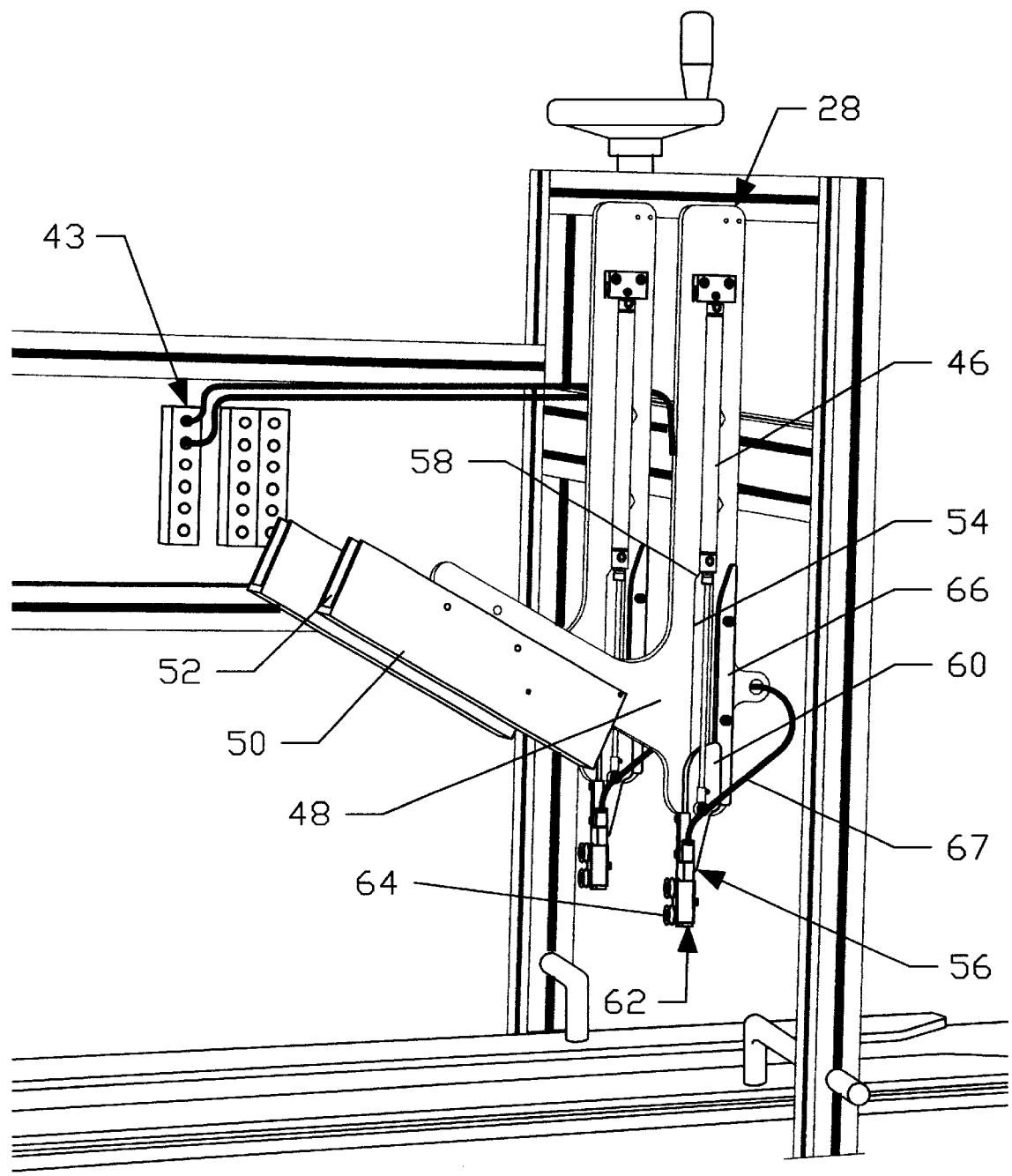
FIG. 3 is an elevated perspective view of a preferred embodiment having a plurality of tagging heads and showing the placement arm assembly used to place the tags.

With reference to FIG. 3, a tagging head assembly 28 further comprises at least one cylinder 46 generally of the pneumatic type and having a cylinder shaft. The cylinder 46 is preferably attached to a support plate 48. The plate 48 enables a tag cartridge reservoir 50 having a tag receiving channel 52 formed therein, to be removably attached. The plate 48 further includes a substantially vertical linear slot 54, and a tag placement assembly 56.

The tag placement assembly 56 reciprocally moves in the slot 54 by virtue of its communication and connection to the cylinder 46 via the cam 60. The placement assembly 56 comes into communication with the beveled end 58 of the slot as an upper limit or stop for its travel when the tip 76 of the cam 60 rides the beveled end 58 during cycling of the apparatus.

Figure 5C:
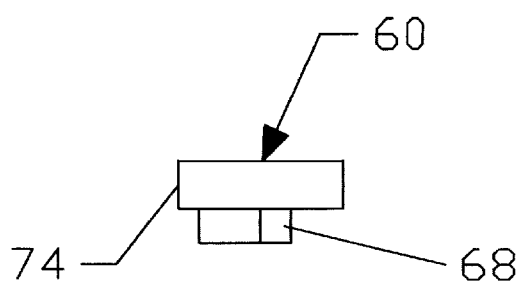
FIGS. 5A, 5B and 5C are side, front and top views respectively of the cam, component of the present invention.
Figure 5B:
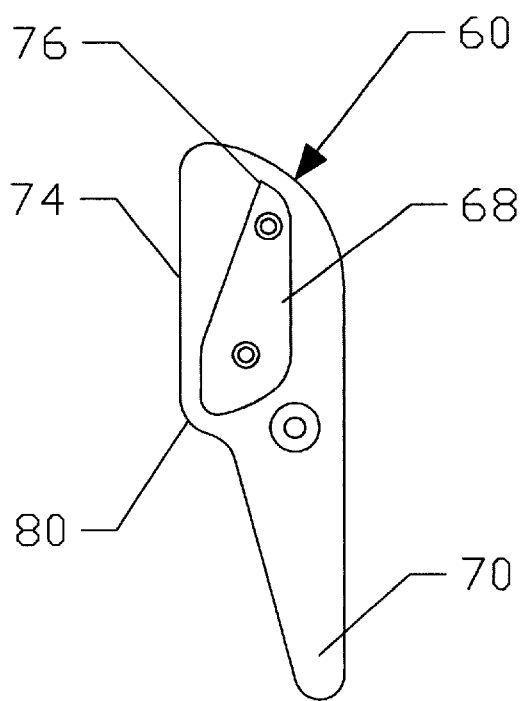
Figure 5A:
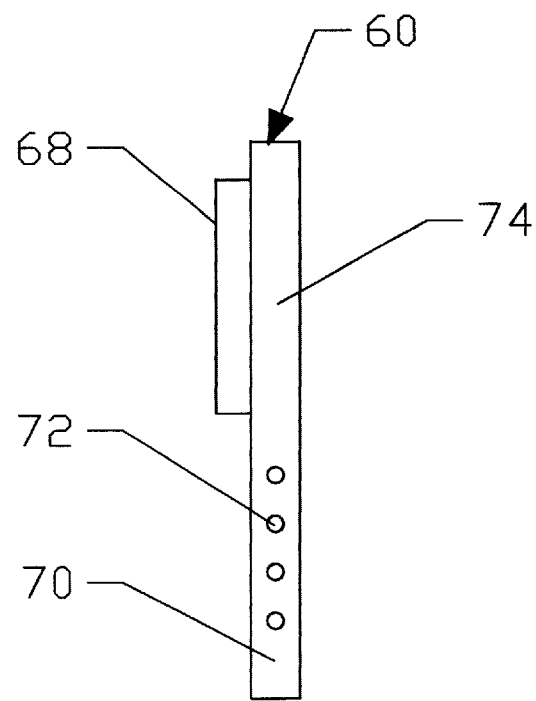

The tag placement assembly 56, therefore, further comprises a cam 60 preferably constructed of a polymeric material for prolonged wear resistance. The cam 60 has a slot engaging portion 68 (see FIG. 5C) which is in communication with the slot 54 and contacts the beveled stop 58 associated with the slot 54 during operation. Optional guide 67 is attached to the plate 48 to help constrain the movements of the cam 60 within the slot 54.

Figure 4:
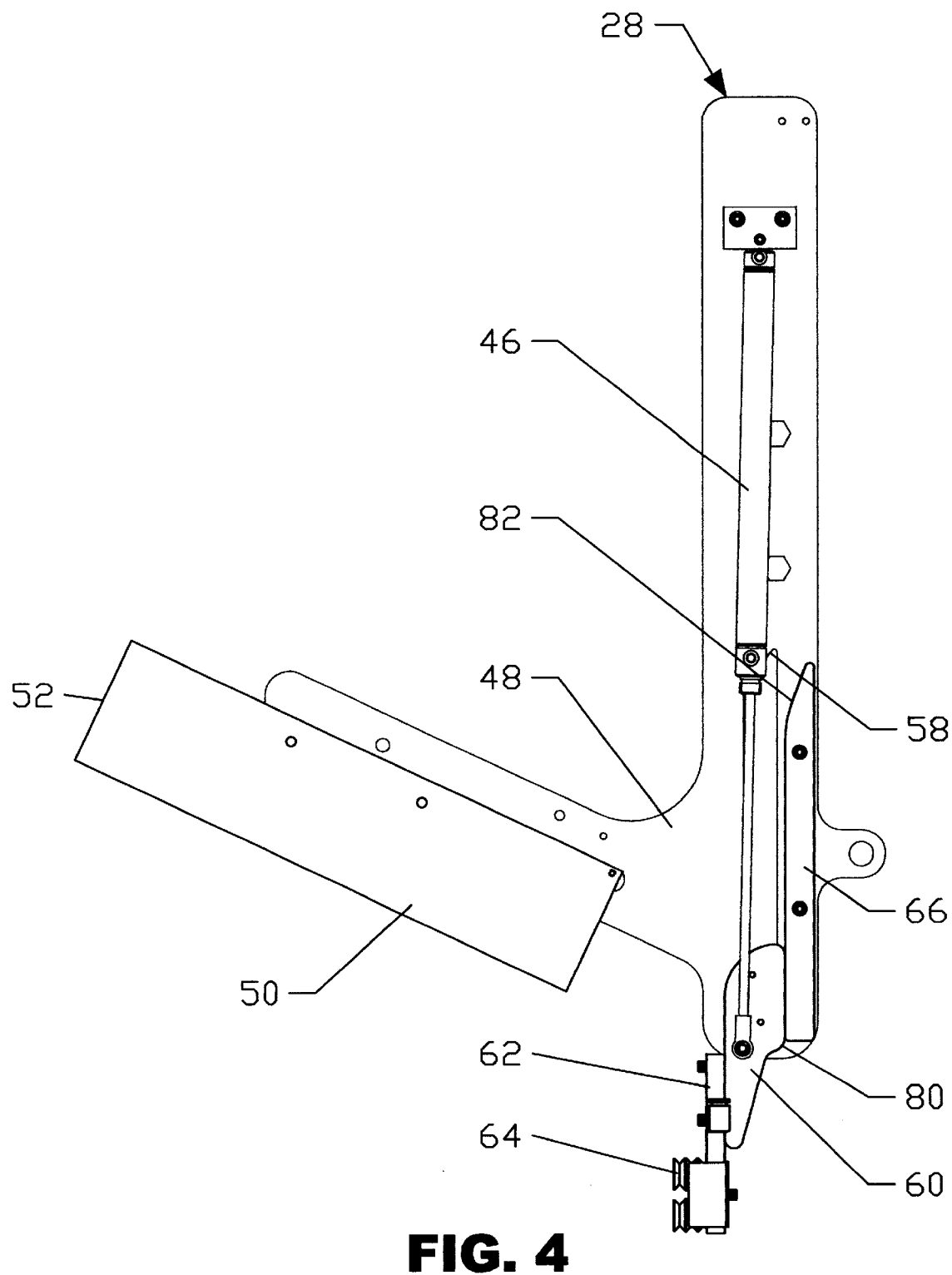
FIG. 4 is a side view of a the tagging head portion of the preferred embodiment shown in FIGS. 1–3.

In addition, the tag placement assembly 56 further includes a placement arm designated generally by the reference numeral 62 (see FIGS. 3, 6A and 6B), which includes at least one but shown with plurality of suction cups 64 (FIGS. 3 and 4) all of which are capable of receiving a vacuum pressure through the vacuum lines 66 and vacuum equipment (not shown) which in turn are in communication with the vacuum regulating assembly 43.

With reference to FIGS. 4 and 5A–5C, the cam 60 further includes the aforementioned slot engaging portion 68, a placement arm tang 70 having a plurality of bores 72 positioned along its length. Vertical edge 74 engages the guide 66 during reciprocation and when the cam 60 is at its uppermost position (not shown) the protrusion 80 of the tang 70 rides over the incline 82 of the guide 66 to cause the cam 60 to rotate the placement arm 62 during use. Of course, it is conceivable for the cam and placement arm to be of unitary construction.

Figure 6B:
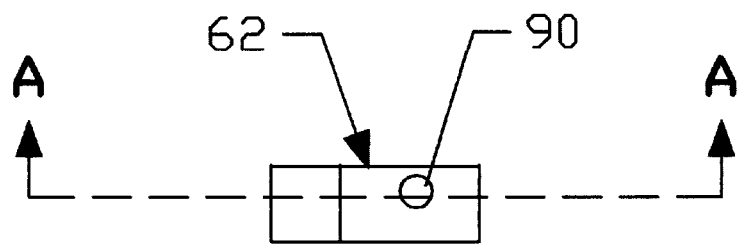
FIGS. 6A and 6B are front and top views respectively of the tag placement arm of FIGS. 1–3.
Figure 6A:
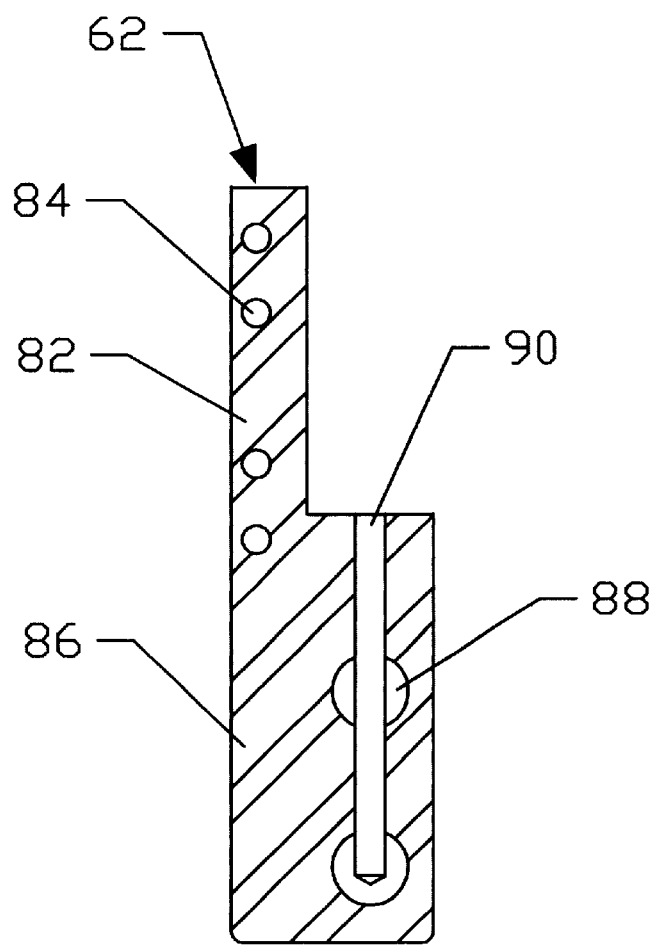

With reference to FIGS. 6A and 6B, the preferred placement arm 62 further comprises an attachment prong 83 having at least one bore 84 which receives a fastener (not shown) to attach the placement arm 62 to the cam tang 70. Prong 82 merges with the body 86 of the placement arm 62 which further includes suction cup receiving craters 88, and vacuum inlet 90 to which a vacuum line (not shown in FIG. 6A) is applied. The suction cup craters 88 may optionally include a peg 92 for rearward support and which may also serve as the cannula for the vacuum of the lowermost suction cup(s) 64 (see FIG. 4).

The vacuum regulating assembly enables the cylinder 46 to cycle up and down to move the placement arm 62, but more specifically the cam 60 within the confines of the slot 54. Movement of the cam 60 within the slot 54 enables the suction cup(s) 64 to be raised and lowered along with the placement arm 62 so as to take possession a tag residing within the channel 52 and driving it downward into communication with a tray container (not shown) residing on the continuous belt 36 during operation.

These and other embodiments of the present invention shall become apparent after consideration of the scope of the specification and drawings set forth herein. All such embodiments and equivalents thereof are contemplated as part of the present invention whose only limitation is the scope of the appended claims attached hereto.

What is claimed is:

1. A tag placement apparatus, comprising:
   a frame;
   a conveyor assembly supported by the frame;
   a tagging head assembly supported by the frame;
      the tagging head assembly further comprises a support plate having a linear slot, a tag placement arm assembly partially configured for reciprocal movement in association with the slot, and cylinder means connected to the tag placement arm assembly for cycling the tag placement arm assembly between a first stop position and a second stop position; and
   a cam, a tag placement arm extending from a portion of the cam, wherein the cam is configured to rotate the tag placement arm when a portion of the cam forcibly contacts a beveled end of the linear slot in response to the cycling of the cylinder means.

2. The apparatus of claim 1, wherein:
   the first stop position is spaced less than ninety degrees from the second stop position and the first stop position corresponds with a tag taking position of the placement arm and the second stop corresponds with a tag placement position of the placement arm.

3. The apparatus of claim 1, further comprising:
   a guide mechanism attached to the plate.

4. The apparatus of claim 1, wherein the conveyor assembly further comprises:
   a continuous belt having an upper race and a lower race, and at least one belt roller.

5. The apparatus of claim 4, further comprising:
   a conveyor bed interpositioned between the upper race and lower race.

6. The apparatus of claim 4, further comprising:
   encoder means for measuring the rotational speed of the belt roller.

7. The encoder means of claim 6, further comprising:
   control means for synchronizing the speed of the continuous belt and the cycling rate of the tag placement arm assembly.

8. The apparatus of claim 1, wherein the cylinder means further comprises:
   a cylinder having a cylinder shaft situated substantially parallel to the slot.

9. A tag placement apparatus for placing tags into communication with a container, comprising:
   a frame having space apart ends;
   conveyor means, supported by the frame, for moving a container resting on a continuous belt portion from one end of the frame to the other;
   a tagging head assembly attached to the frame wherein the tagging head assembly includes a support plate having a substantially linear slot, a tag placement arm assembly partially configured for reciprocal movement within the confines of the slot, and at least one cylinder having a cylinder shaft attached to the tag placement arm assembly for cycling the tag placement arm assembly between a first tag taking position and a second tag placement position; and
   a cam configured for engagement with the linear slot, a tag placement arm extending from a portion of the cam, wherein the cam is configured to rotate the tag placement arm when a portion of the cam forcibly contacts a beveled end of the slot in response to the cycling of the cylinder shaft to enable the tag placement arm to move between the tag taking position and the tag placement position.

10. The apparatus of claim 9, wherein:
the tag taking position is less than 90 degrees from the tag placement position.

11. The apparatus of claim 9, further comprising:
a cam guide mechanism attached to the plate.

12. The apparatus of claim 9, further comprising:
a belt roller associated with the conveyor means; and
an encoder means for measuring the rotational speed of the belt roller.

13. The encoder means of claim 12, further comprising:
control means for synchronizing the speed of the continuous belt and the cycling rate of the tag placement arm assembly in response to the measurements of the encoder.

14. The apparatus of claim 9, wherein:
the cylinder shaft situated parallel to the slot.

* * * * *